United States Patent

Unger et al.

[11] Patent Number: 5,371,111
[45] Date of Patent: Dec. 6, 1994

[54] METHOD OF REPROCESSING CURED POLYSULFIDE AND/OR MERCAPTAN ELASTOMERS

[75] Inventors: Gerfried Unger, Frankfurt am Main; Ralph-Josef Hecktor, Friedberg; Reiner Theobald; Franz Specht, both of Frankfurt am Main, all of Germany

[73] Assignee: Metallgesellschaft Aktiengesellschaft, Frankfurth am Main, Germany

[21] Appl. No.: 994,136

[22] Filed: Dec. 21, 1992

[30] Foreign Application Priority Data

Dec. 21, 1991 [DE] Germany ............... 4142500

[51] Int. Cl.$^5$ ............................................. C08G 75/12
[52] U.S. Cl. .................................. 521/40; 524/425; 525/535; 525/537; 528/374; 528/375; 528/387
[58] Field of Search ............. 524/425; 528/374, 375, 528/387; 525/535, 537; 521/40

[56] References Cited

U.S. PATENT DOCUMENTS 4,623,711  11/1986  Morris et al. .................. 582/375

*Primary Examiner*—Melvyn I. Marquis
*Assistant Examiner*—Helen Lee
*Attorney, Agent, or Firm*—Michael J. Striker

[57] ABSTRACT

The method of reprocessing cured polysulfide and polymercaptan elastomers includes reacting an 0.5 to 400 percent-by-weight portion of a polysulfide and/or polymercaptan elastomer with at least one liquid di- or polymercapto compound, with a plasticizer and with a filling material and with an binding agent to form a polysulfide sealing material-base component. Then a polysulfide sealing material curing agent is added to the polysulfide sealing material-base component to form the reprocessed cured polysulfide sealing material with a Shore-A-Hardness>40 and a tensile strength>1 MPa.

8 Claims, No Drawings

METHOD OF REPROCESSING CURED POLYSULFIDE AND/OR MERCAPTAN ELASTOMERS

BACKGROUND OF THE INVENTION

The present invention relates to a method of reprocessing cured polysulfide and/or polymercaptan elastomers.

This kind of elastomer occurs as a resulting residual material in the processing of reactive one-component or multi-component polysulfide and/or polymercaptan prepolymers to form sealing or coating compositions.

Residual amounts of liquid and pasty individual components of multi-component systems can substantially be re-used, if they are recycled into the production process. According to the disclosure in U.S. Pat. No. 4,623,711, liquid polymercaptan polymers of high viscosity can be reacted with organic dimercaptans having a low molecular weight in the presence of organic amines to form liquid polymers which have a low viscosity. Because of their modified terminal groups, these liquid polymers permit the production of cured polymers having a higher stability.

As soon as the individual components of the multi-component systems have contacted each other or the reaction of single-component systems has been started, any resulting solid elastomeric residual or waste materials, which are partly or fully cured, cannot be re-used according to the prior art and were disposed of as waste materials. Such materials have a particularly high stability to light and ozone and to numerous chemicals (See E. Dachselt, Thioplaste, Leipzig, 1971, pp. 50 to 56, and A. Damusis, Sealants, N.Y., 1967, p. 182). In the case of one-component systems such residual materials may form during the production in production plants. During the processing, residual amounts are left in the containers used for the processing, such as cartridges. In the case of one-component or multi- component systems, partly or fully cured residual materials are formed in the material-supplying parts of processing plants, when such plants are being started up or have been shut down or are being cleaned or during the removal of surplus amounts as the material is applied to the structural parts.

Solid elastomers, which cannot be re-used and must be disposed of as waste, also become available at the end of the useful life of structural parts in which these elastomers are used.

Polysulfide or polymercaptan compositions are used, e.g., as sealants or coating compositions. Cured polysulfide and polymercaptan joint-sealing materials must be disposed of as waste materials during a structural alteration, rehabilitation or wrecking of buildings. Polysulfide or polymercaptan sealants used in insulating glass panes must be disposed of as waste materials at the end of the life of an insulating glass pane or when this type of pane has been prematurely removed. Cured polysulfide or polymercaptan sealing materials used in aircraft are disposed of after decommissioning the aircraft. Similarly, polysulfide or polymercaptan coating materials of various kinds become available as waste materials when the corresponding structural parts have been removed. In many cases the disposal is difficult, because the cured elastomers strongly adhere to the substrate.

European Patent Specification 0 188 833 discloses that cured polysulfide sealing materials can be restored to a liquid to pasty state by a depolymerizing composition consisting of an amine and a compound that contains mercapto groups or di- or polysulfide groups. With the help of a solvent for decreasing the viscosity of the composition, that composition can be used to clean processing machines or structural parts by removing residual polysulfide sealing materials. But the resulting decomposition products of the polysulfide sealing materials dissolved in solvents can no longer be cured by the known oxidative curing mechanism for polysulfide or polymercaptan systems and for this reason they cannot be used again for the same or similar purpose and are disposed of as waste material. Because of the solvent content and the components contained in these mixtures of solvents and depolymerized sealing materials, they must be disposed of as hazardous waste materials.

SUMMARY OF INVENTION

It is an object of the present invention to provide a method by which cured solid polysulfide and/or polymercaptan elastomers can be reprocessed so that they need no longer be disposed of as waste materials.

According to the present invention, the method of reprocessing cured polysulfide and/or polymercaptan elastomers comprises reacting an 0.5 to 400% by weight portion of the cured polysulfide and/or polymercaptan elastomers with a portion of liquid di- or polymercapto compounds to form liquid-to-pasty mercapto-terminated prepolymers; mixing with plasticizer, filling material and binding agent and hardening by adding some polysulfide sealing material curing agent (curing paste) to form a reprocessed polysulfide sealing material with a Shore-A-Hardness>40 and a tensile strength of>1 MPa. The weight of the portion of liquid di- or polymercapto compound used is by definition always 100% by weight. The process has the advantage that the largely chemically inert, cured, solid polysulfide and/or polymercaptan elastomers can be again reacted to liquid-to-pasty products with mercapto end groups. Because of that, the recycling of the cured polysulfide and/or polymercaptan elastomers is possible after separation of impurities and, as needed, additive materials.

A special advantage of this method is that the granulated cured solid polysulfide and/or polymercaptan elastomers can be reacted with low molecular weight polysulfide and/or polymercaptan-liquid polymers at temperatures of 0° to 100° C. The advantage of this reaction is that no system-foreign auxiliary materials, such as solvents, are required.

The reprocessing of the cured polysulfide and/or polymercaptan elastomers advantageously takes place in the presence of a basic compound. The reaction time of this reaction can be shortened by adding a basic compound. Suitable basic compounds include, inter alia, alkali alcoholates, amines and amides.

In the preferred embodiment of the invention 0.5 to 20% by weight of granulated polysulfide and/or polymercaptan elastomers are reacted at temperatures of 70° to 80° C. in the presence of 1 mole of an amino compound, such as trimethylamine, per mole of compounds to be decomposed with liquid polysulfide and/or polymercaptan polymers having a molecular weight in the range from 500 to 8000 g/mole and having the same prepolymer structure as the polysulfide and/or polymercaptan elastomer. The properties of the resulting liquid-to-pasty products desirably do not differ from those of the prepolymers from which the cured polysulfide and/or polymercaptan elastomers have originated.

A special advantage afforded by the method resides in that the cured polysulfide and/or polymercaptan elastomers can entirely be reprocessed with the help of such agents so that no waste is formed which might possibly become hazardous waste, which requires special disposal methods.

The decomposition products which have been formed by the process and contain terminal mercapto groups can desirably be re-used in the production of one-component or multi-component polysulfide and/or polymercaptan sealants so that the cured polysulfide and/or polymercaptan elastomers can be recycled after impurities and any additives have been removed.

The plasticizer can be benzylbutyl phthalate, the filling agent can be chalk and the binding agent can be 3-glycidoxypropyltrimethoxysilane. The curing agent is advantageously a manganese-based curing agent known to one skilled in the arts.

Plasticizers: Dibutylphthalate, Diisodecylphthalate, Dioctylphthalate, Chloroparaffins
    Fillers: Silica, Aluminum oxide, Mica, Kaoline, natural and synthetic silicates
    Binding agent (adhesion promoter): 3-Mercaptopropy(trimethoxy silane
    Curing agent: manganese dioxide, lead dioxide, potassium dichloro, zinc peroxide, calcium peroxide, organic hydroperoxides

EXAMPLES

Example 1

A suspension of dissolved polysulfide sealing material in a liquid polysulfide polymer according to Example 2 is mixed with conventional additives used in a polysulfide sealing composition in accordance with the following recipe:

| | |
|---|---|
| 400 g | liquid polysulfide polymer LP$^{(R)}$ 2 containing 4 g dissolved polysulfide sealing material |
| 100 g | benzylbutyl phthalate plasticizer |
| 490 g | chalk(filler) |
| 10 g | 3-glycidoxypropyltrimethoxysilane binding agent. |

The sealing paste is mixed with 100g conventional manganese-dioxide-based curing paste (e.g. Naftotherm ® M82, Part B, Chemetall GmbH) for polysulfide sealing material. When fully cured, the resulting polysulfide sealing material has Shore-A-hardness of >40 and a maximum tensile strength of >1 Mpa.

Example 2

A suspension of polysulfide sealing material dissolved in a liquid polysulfide polymer is mixed with conventional additives used in a polysulfide sealing composition in accordance with the following recipe:

| | |
|---|---|
| 340 g | Liquid polysulfide polymer LP$^{(R)}$ 3 containing 170 g dissolved polysulfide sealing material |
| 74 g | benzylbutyl phthalate plasticizer |
| 408 g | chalk(filler) |
| 8 g | 3-glycidoxypropyltrimethoxysilane binding agent. |

The sealing paste is mixed with 100 g conventional manganese-based curing paste for polysulfide sealing material. When fully cured, the resulting polysulfide sealing material has Shore-A-hardness of >40 and a maximum tensile strength of >1 Mpa.

Example 3

400g (4.2 moles) ethanedithiol and 840 g of cured polysulfide sealing material granulate (diameter about 2 mm) are stirred for several hours at 60° C. The cured elastic sealing material dissolves. After cooling to 25° C. the homogeneous, rigid paste had a viscosity of more than 100 Pa.s (Brookfield Viscometer DV II, Spindel 4, 12 upm).

The paste so obtained is mixed with 350g polysulfide-liquid polymer LP-32 ® (Morton International), 180 g plasticizer (Benzylbutylphthalate), 1200 g filling material (Chalk) and 30 g silane adhesive material (3-glycidoxypropyltrimethoxysilane) to form a polysulfide sealing material-base component.

The polysulfide sealing material-base component is mixed with 300 g of a conventional polysulfide curing paste. The mixture is hardened to an elastic polysulfide sealing material with a Shore-A-Hardness of >40 or a maximum tensile strength of >1 MPa.

Comparative Example 4

400 g (5.1 mole) 2-mercaptoethanol and 840 g of a cured polysulfide sealing material-granulate (particle diameter about 2 mm) are stirred several hours at 60° C. The cured elastic sealing material dissolves. After cooling to 25° C., the homogeneous viscous paste has a viscosity of 25,000 mPa.s (Brookfield-Viscometer DV II, Spindel 4, 12 upm).

The suspension so obtained is mixed with 350 g polysulfide-liquid polymer LP-32(R) (Morton International), 180 g plasticizer (Benzylbutyl phthalate), 1200 g filling material (Chalk) and 30 g silane-binding agent (3-glycidoxypropyltrimethoxysilane) to form a polysulfide sealing material-base component.

The polysulfide sealing material-base component is mixed with 300 g of a conventional polysulfide sealing material-curing paste. The viscosity of the mixture increases by oxidative coupling of the mercapto end groups. Hardening to the elastic sealing material is however not possible. The mixture remains a viscous paste and is not usable as a sealing material.

Example 5

400 g (2.7 moles) 1,6-hexanedithiol and 840 g of a cured polysulfide sealing material-granulate (diameter about 2 mm) are stirred for several hours at 60° C. The cured elastic sealing material dissolves. After cooling to 25° C. the homogenous viscous paste has a viscosity of 25,000 mPa.s (Brookfield Viscometer DV II, Spindel 4, 12 upm).

The homogeneous paste so obtained is mixed with 350 g polysulfide-liquid polymer LP-32 ® (Morton International), 180 g plasticizer (Benzylbutyl phthalate), 1200 g filling material (Chalk) and 30 g silane-binding agent (3-glycidoxypropyltrimethoxysilane) to form a polysulfide sealing material-base component.

The polysulfide sealing material-base component is mixed with 300 g of a conventional polysulfide sealing material curing paste. The mixture hardens to an elastic polysulfide sealing material with a Shore-A-Hardness of >40 and a maximum tensile strength of >1 MPa.

Comparative Example 6

400 g (1.98 mole) Dodecylmercaptan and 100 g of a cured polysulfide sealing material-granulate (diameter about 2 mm) are stirred at 60° C. for several hours. The cured elastic sealing material dissolves, the residual solid material settling out. The supernatant liquid has a viscosity of 7,500 mPa.s (Brookfield Viscometer DV II, Spindel 2, 12 upm) after cooling at 25° C.

The solution so obtained and the settled solid material were mixed with 570 g polysulfide-liquid polymer LP-32 ®, 286 g plasticizer (Benzyl butyl phthalate), 1614 g filling material (Chalk) and 30 g silane-binding agent (3-glyoxypropyltrimethoxysilane) to form a polysulfide sealing material-base component.

The polysulfide sealing material-base component is mixed with 300 g of a conventional polysulfide sealing material-curing paste. The viscosity of the mixture increases by oxidative coupling of the mercapto end groups. Hardening to the elastic sealing material is however not possible. The mixture remains a viscous paste and is not usable as a sealing material.

Example 7

1000 g of cured polysulfide sealing material-granulate are stirred for several hours at 70° C. into 100 g of polysulfide liquid polymer LP-3 ® (Morton International). After about 1.5 hours the cured elastic sealing material dissolves. At 20° C. the viscosity of the polysulfide liquid polymer LP-3 ® amounts to 1,600 mPa.s, and that of the mixture of the liquid polymer and the dissolved sealing material is 13,000 mPa.s (Rotation Viscometer Plate/Cone measuring system, D=60 1/s).

The mixture so obtained is mixed with 260 g plasticizer (Benzylbutyl phthalate), 1700 g filling material (Chalk) and 40 g silane-binding agent (3-glycidoxypropyl-trimethoxysilane) to form a polysulfide sealing material-base component.

1000 g of a polysulfide sealing material-base component is mixed with 100 g of a conventional polysulfide sealing material curing paste. The mixture hardens to an elastic polysulfide sealing material with a Shore-A-Hardness of >40 and a maximum tensile strength of >1 MPa.

While the invention has been illustrated and embodied in a method of reprocessing cured polysulfide and/or mercaptan elastomers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art fairly constitute essential characteristics of the generic or specific aspects of this invention.

What is claimed is new and desired to be protected by Letters Patent is set forth in the appended claims.

We claim:

1. A method of reprocessing cured polysulfide and polymercaptan elastomers, said method comprising the steps of:
    a. reacting at temperatures from 0° to 100° C. an 0.5 to 400 percent-by-weight portion of a cured solid elastomer selected from the group consisting of cured solid polysulfide elastomers, cured solid polymercaptan elastomers and mixtures thereof with at least one liquid compound having a molecular weight from 500 to 8000 g/mole and selected from the group consisting of dimercapto compounds and polymercapto compounds, a plasticizer, a filling material and a binding agent to form liquid to pasty mercapto-terminated prepolymers; and
    b. then adding a curing paste to said liquid-to-pasty mercapto-terminated prepolymers to form a reprocessed cured polysulfide sealing material with a Shore-A-Hardeness >40 and a tensile strength >1 MPa.

2. A method as defined in claim 1, wherein the reacting takes place in the presence of a basic compound.

3. A method as defined in claim 1, wherein the reacting takes place at a temperature from 70° to 80° C. in the presence of one mole of an amino compound and the cured solid elastomer reacted during the reacting is present in an amount of from 0.5 to 20% by weight and said at least one liquid compound has a prepolymer structure which is the same as said cured solid elastomer.

4. A method as defined in claim 3, wherein the amino compound is trimethylamine.

5. A method as defined in claim 1, further comprising obtaining said portion of said cured solid elastomer by collecting elastomeric waste materials.

6. A method as defined in claim 1, wherein said cured solid elastomer contains impurities and additives.

7. A method as defined in claim 2, wherein said basic compound is selected from the group consisting of alkali alcoholates, amines and amides.

8. A method as defined in claim 1, wherein said curing paste is a manganese dioxide-based curing paste.

* * * * *